US008913282B2

(12) United States Patent
Murayama et al.

(10) Patent No.: US 8,913,282 B2
(45) Date of Patent: Dec. 16, 2014

(54) IMAGE FORMING APPARATUS

(75) Inventors: Kentaro Murayama, Kasugai (JP);
Osamu Takahashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 156 days.

(21) Appl. No.: 13/073,893

(22) Filed: Mar. 28, 2011

(65) Prior Publication Data
US 2011/0317175 A1 Dec. 29, 2011

(30) Foreign Application Priority Data

Jun. 28, 2010 (JP) ................................. 2010-146578

(51) Int. Cl.
*G06K 15/02* (2006.01)
*G06K 15/00* (2006.01)

(52) U.S. Cl.
CPC ............ *G06K 15/002* (2013.01); *G06K 15/027* (2013.01)
USPC ............... 358/1.2; 358/518; 399/39; 399/301

(58) Field of Classification Search
CPC combination set(s) only.
See application file for complete search history.

(56) References Cited

U.S. PATENT DOCUMENTS

| 6,335,747 | B1 | 1/2002 | Munakata |
| 2006/0170754 | A1* | 8/2006 | Kitao ............................ 347/116 |
| 2007/0172245 | A1 | 7/2007 | Yoshida et al. |
| 2008/0019740 | A1* | 1/2008 | Oouchi .......................... 399/301 |
| 2008/0043299 | A1* | 2/2008 | Ikeda ............................ 358/518 |
| 2009/0091773 | A1* | 4/2009 | Kushida ....................... 358/1.12 |
| 2009/0147284 | A1* | 6/2009 | Suzuki ............................ 358/1.9 |
| 2009/0269089 | A1* | 10/2009 | Nishikawa et al. ............. 399/39 |
| 2009/0304418 | A1* | 12/2009 | Aikawa ......................... 399/301 |

FOREIGN PATENT DOCUMENTS

| JP | H08-262829 | A | 10/1996 |
| JP | H11-119504 | A | 4/1999 |
| JP | H11-218989 | A | 8/1999 |
| JP | 2001-109218 | A | 4/2001 |
| JP | 2001-337507 | A | 12/2001 |
| JP | 2002-135614 | A | 5/2002 |
| JP | 2002-202648 | A | 7/2002 |
| JP | 2002-244393 | A | 8/2002 |

(Continued)

OTHER PUBLICATIONS

Japan Patent Office, Notification of Reasons for Refusal for Japanese Patent Application No. 2010-146578 (counterpart Japanese patent application), dispatched May 28, 2013.

(Continued)

*Primary Examiner* — Tammy Pham
*Assistant Examiner* — Idowu O Osifade
(74) *Attorney, Agent, or Firm* — Baker Botts L.L.P.

(57) ABSTRACT

An image forming apparatus includes an automatic acquiring unit which is configured to form a mark for detecting at least one of positional deviation and density deviation and acquire an amount of deviation by measuring the mark, an image forming unit which is configured to form an image while adjusting at least one of positional deviation and density deviation based on a correction value specified by the amount of deviation, and an output unit which is configured to execute at least one of a pattern printing process and a notifying process when an amount of deviation within a permissible range is not acquired by the automatic acquiring unit. The pattern printing process includes printing a pattern image for specifying a correction value on a recording sheet. The notifying process includes making notification for prompting execution of the pattern printing process.

8 Claims, 10 Drawing Sheets

(56) References Cited

FOREIGN PATENT DOCUMENTS

| | | |
|---|---|---|
| JP | 2004-109270 A | 4/2004 |
| JP | 2006-159890 A | 6/2006 |
| JP | 2010-079125 A | 4/2010 |
| JP | 2010-096865 A | 4/2010 |

OTHER PUBLICATIONS

Japan Patent Office, Notification of Reason for Refusal for Japanese Patent Application No. 2010-146578 (counterpart Japanese patent application), dispatched Dec. 10, 2013.

* cited by examiner

| COMBINATION | | CORRECTION VALUE | | RANGE |
| --- | --- | --- | --- | --- |
| ADJUSTMENT COLOR | SCANNING DIRECTION | AUTOMATIC | MANUAL | |
| C COLOR | MAIN SCANNING DIRECTION | 10 | 2 | NARROW RANGE |
| C COLOR | SUB-SCANNING DIRECTION | 5 | 8 | WIDE RANGE |
| M COLOR | MAIN SCANNING DIRECTION | 21 | 12 | WIDE RANGE |
| M COLOR | SUB-SCANNING DIRECTION | 5 | 0 | NARROW RANGE |
| Y COLOR | MAIN SCANNING DIRECTION | 10 | 0 | NARROW RANGE |
| Y COLOR | SUB-SCANNING DIRECTION | 5 | 0 | NARROW RANGE |

IMAGE FORMING APPARATUS

CROSS-REFERENCE TO RELATED APPLICATION

This application claims priority from Japanese Patent Application No. 2010-146578, filed on Jun. 28, 2010, the entire subject matter of which is incorporated herein by reference.

TECHNICAL FIELD

Aspects of the present invention relate to an image forming apparatus that forms a mark for image adjustment and performs image adjustment based on an amount of deviation acquired by detection of the mark.

BACKGROUND

An image forming apparatus performs an image adjustment so that a position or density of an image is not deviated. A sequence of such image adjustment includes, for example, forming a registration pattern, which is a mark for adjusting positional deviation, on a belt member for sheet conveyance for each of colors, acquiring an amount of deviation between the registration pattern of a basic color and the registration pattern of a detection target color and correcting positional deviation of an image of the detection target color based on a correction value specified based on the amount of deviation.

A correction value may be input by a user. For example, JP-A-2002-244393 describes a method of using both a correction value input by a user (manual correction value) and a correction value acquired by detection of a registration pattern (automatic correction value) to correct positional deviation in a color image.

SUMMARY

However, the above image forming apparatus has a following problem. That is, in the image forming apparatus that forms a plurality of registration patterns and detects the registration patterns to automatically acquire amounts of deviation, an appropriate amount of deviation cannot be acquired in some cases. For example, when the amount of positional deviation is too large, the registration patterns may be overlapped with each other, so that it may be not possible to detect the registration patterns. In addition, when the transfer belt has a damaged part or foreign substances, they may be falsely detected as a registration pattern. When the amount of deviation is calculated under such situations, the amount may be inappropriate in some cases. In the conventional image forming apparatus, when an appropriate amount of deviation cannot be acquired, it is not clear for a user how to easily solve the problem.

Accordingly, it is an aspect of the present invention to provide an image forming apparatus that forms a mark for image adjustment, detects the mark to automatically acquire an amount of deviation and can simply solve a situation where an appropriate amount of deviation cannot be acquired.

According to an illustrative embodiment of the present invention, there is provided an image forming apparatus includes: an automatic acquiring unit which is configured to form a mark for detecting at least one of positional deviation and density deviation and acquire an amount of deviation by measuring the mark; an image forming unit which is configured to form an image while adjusting at least one of positional deviation and density deviation based on a correction value specified by the amount of deviation; and an output unit which is configured to execute at least one of a pattern printing process and a notifying process when an amount of deviation within a permissible range is not acquired by the automatic acquiring unit, the pattern printing process including printing a pattern image for specifying a correction value of at least one of positional deviation and density deviation, on a recording sheet, the notifying process including making notification for prompting execution of the pattern printing process.

According to the above configuration, there is provided an image forming apparatus that forms a mark for image adjustment, detects the mark to automatically acquire an amount of deviation and can simply solve a situation where an appropriate amount of deviation cannot be acquired.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Hereinafter, an image forming apparatus and an image forming system according to illustrative embodiments will be described with reference to the accompanying drawings. In the illustrative embodiments, the present invention is applied to a multi function peripheral (MFP) having a color printing function.

[Configuration of MFP]

Figure 1:
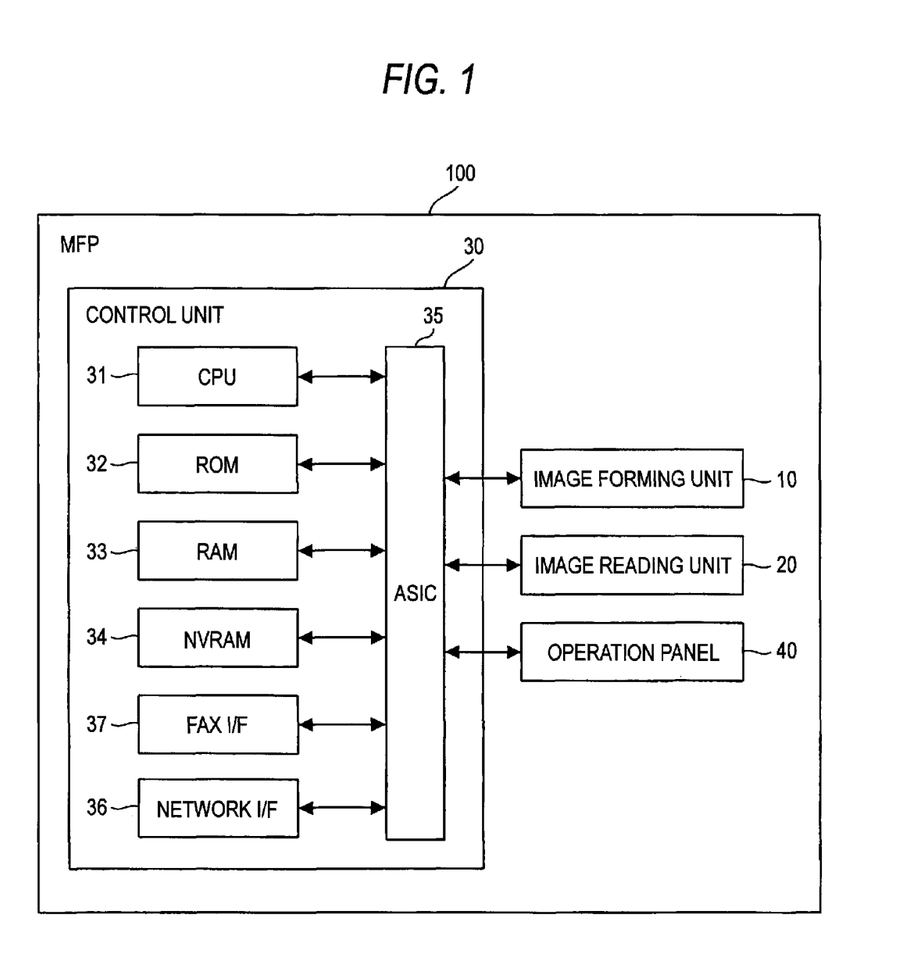
FIG. 1 is a block diagram showing an electrical configuration of an MFP.

As shown in FIG. 1, an MFP 100 of this illustrative embodiment includes a control unit 30 having a CPU 31, a ROM 32, a RAM 33, an NVRAM (non-volatile RAM) 34, an ASIC 35, a network interface 36 and a FAX interface 37. In addition, the control unit 30 is electrically connected to an image forming unit 10 that forms an image on a sheet, an image reading unit 20 that reads out an image of a sheet and an operation panel 40 that displays an operation situation and receives an input operation by a user.

The CPU 31 executes operations for implementing various functions such as an image reading function, an image forming function, a FAX data transmission/reception function and an image adjustment function (described later), and functions as a center of control. The ROM 32 stores therein various control programs for controlling the MFP 100, various settings, initial values and the like. The RAM 33 is used as a work area from which the various control programs are read out or a storage area that temporarily stores image data. The NVRAM 34 is a non-volatile storage device and is used as a storage area that preserves various settings, image data and the like.

Based on the control programs read out from the ROM 32 or signals transmitted from various sensors, the CPU 31 controls the respective constitutional elements of the MFP 100 (for example, a turn-on timing of an exposure device configuring the image forming unit 10, driving motors of various rollers configuring a conveyance path of a sheet and a moving motor of an image sensor unit configuring the image reading unit 20) through the ASIC 35 while storing results of the processing in the RAM 33 or NVRAM 34.

The network interface 36 is connected to a network and enables connection with the other information processing apparatuses. The FAX interface 37 is connected to a telephone line and enables connection with a FAX apparatus of the other party. The MFP 100 performs data communication with an external apparatus through the network interface 36 or FAX interface 37.

[Configuration of Image Forming Unit]

Figure 2:
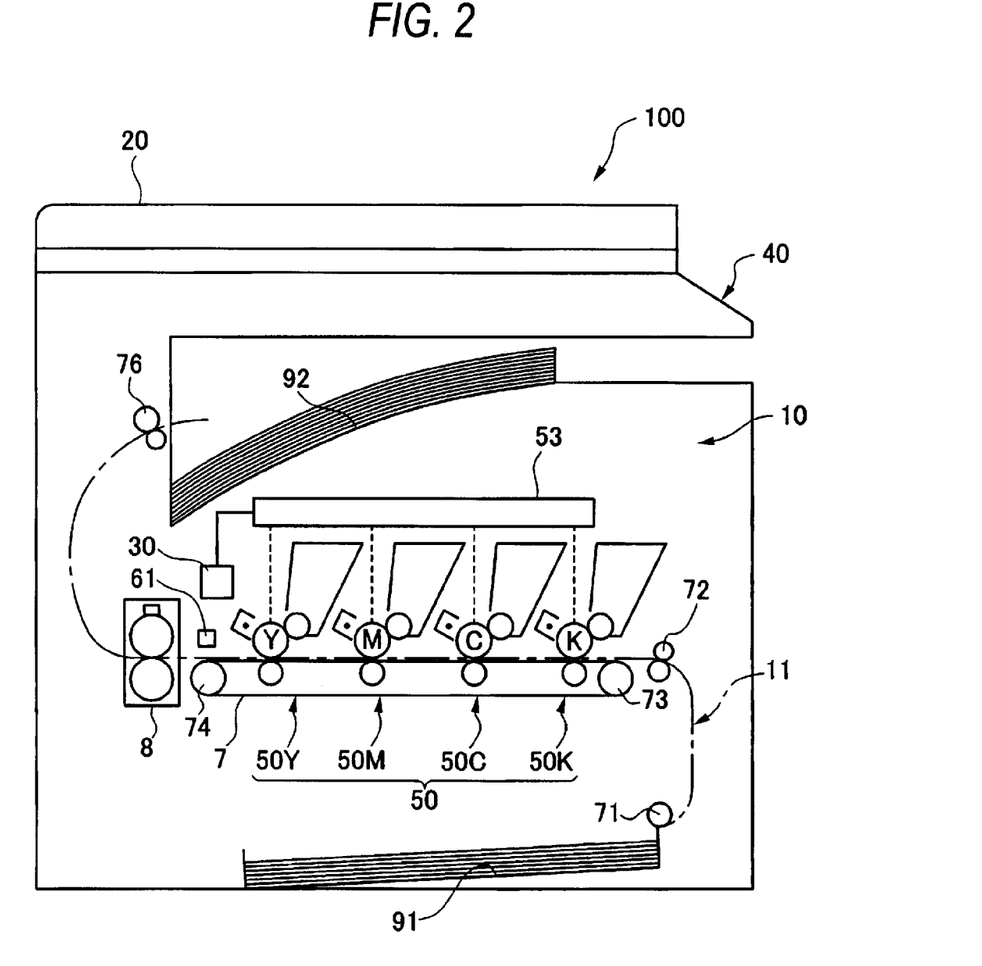
FIG. 2 shows a schematic configuration of an image forming unit of the MFP shown in FIG. 1.

Next, a configuration of the image forming unit 10 of the MFP 100 will be described with reference to FIG. 2. The image forming unit 10 has a process unit 50 that forms a toner image by an electro-photographic method and transfers the toner image on a sheet, a fixing device 8 that fixes unfixed toner on the sheet, a sheet feeding tray 91 that accommodates sheets therein before the image transfer and a sheet discharge tray 92 which receives sheets thereon after the image transfer. The image reading unit 20 is arranged above the image forming unit 10.

The image forming unit 10 has an exposure device 53 that illuminates light to the respective process units 50Y, 50M, 50C, 50K, a conveyance belt 7 that conveys a sheet to transfer positions of the respective process units 50Y, 50M, 50C, 50K and a mark sensor 61 that detects a pattern image formed on the conveyance belt 7.

In addition, the image forming unit 10 is provided therein with a conveyance path 11 (one dotted and dashed line in FIG. 2) having a substantial S shape so that the sheet accommodated in the sheet feeding tray 91 positioned at a bottom passes through a feeder roller 71, registration rollers 72, the process unit 50 and the fixing device 8 and is then guided to the sheet discharge tray 92 through sheet discharge rollers 76.

The process unit 50 can form a color image and includes the process units corresponding to respective colors of yellow (Y), magenta (M), cyan (C) and black (K) in parallel. Specifically, the process unit 50 has the process unit 50Y that forms an image of a Y color, the process unit 50M that forms an image of an M color, the process unit 50C that forms an image of a C color and the process unit 50K that forms an image of a K color. The respective process units 50Y, 50M, 50C, 50K are arranged at a predetermined interval in a conveyance direction of the sheet.

In the process unit 50, a surface of a photosensitive member is uniformly charged by a charging device. Then, the photosensitive member is exposed by the light from the exposure device 53 and an electrostatic latent image corresponding to an image formed on a sheet is thus formed on the photosensitive member. Then, toner is supplied to the photosensitive member through a developing device. Thereby, the electrostatic latent image on the photosensitive member becomes a visible image as a toner image.

The conveyance belt 7 is an endless belt member that is wound around the conveyance rollers 73, 74 and is made of a resin material such as polycarbonate and the like. The conveyance belt 7 is rotated in a counterclockwise direction as the conveyance roller 74 is rotated. Thereby, the sheet put on the conveyance belt is conveyed from the registration rollers 72 toward the fixing device 8.

The image forming unit 10 picks up the sheets accommodated in the sheet feeding tray 91 one by one and conveys the sheet onto the conveyance belt 7. Then, the image forming unit 10 transfers the toner image formed in the process unit 50 to the sheet. At this time, for a case of a color printing, toner images are formed by the respective process units 50Y, 50M, 50C, 50K and are then overlapped with each other on the sheet. In the meantime, for a case of a monochrome printing, a toner image is formed only by the process unit 50K and is then transferred on the sheet. Thereafter, the sheet on which the toner images are transferred is conveyed to the fixing device 8 and is then heat-fixed on the sheet. Then, the sheet after the fixing is discharged to the sheet discharge tray 92.

The mark sensor 61 is provided downstream from the process units 50Y, 50M, 50C, 50K and upstream from the fixing device 8 with respect to the conveyance direction of the sheet and detects a pattern for image adjustment formed on the conveyance belt 7.

Figure 3:
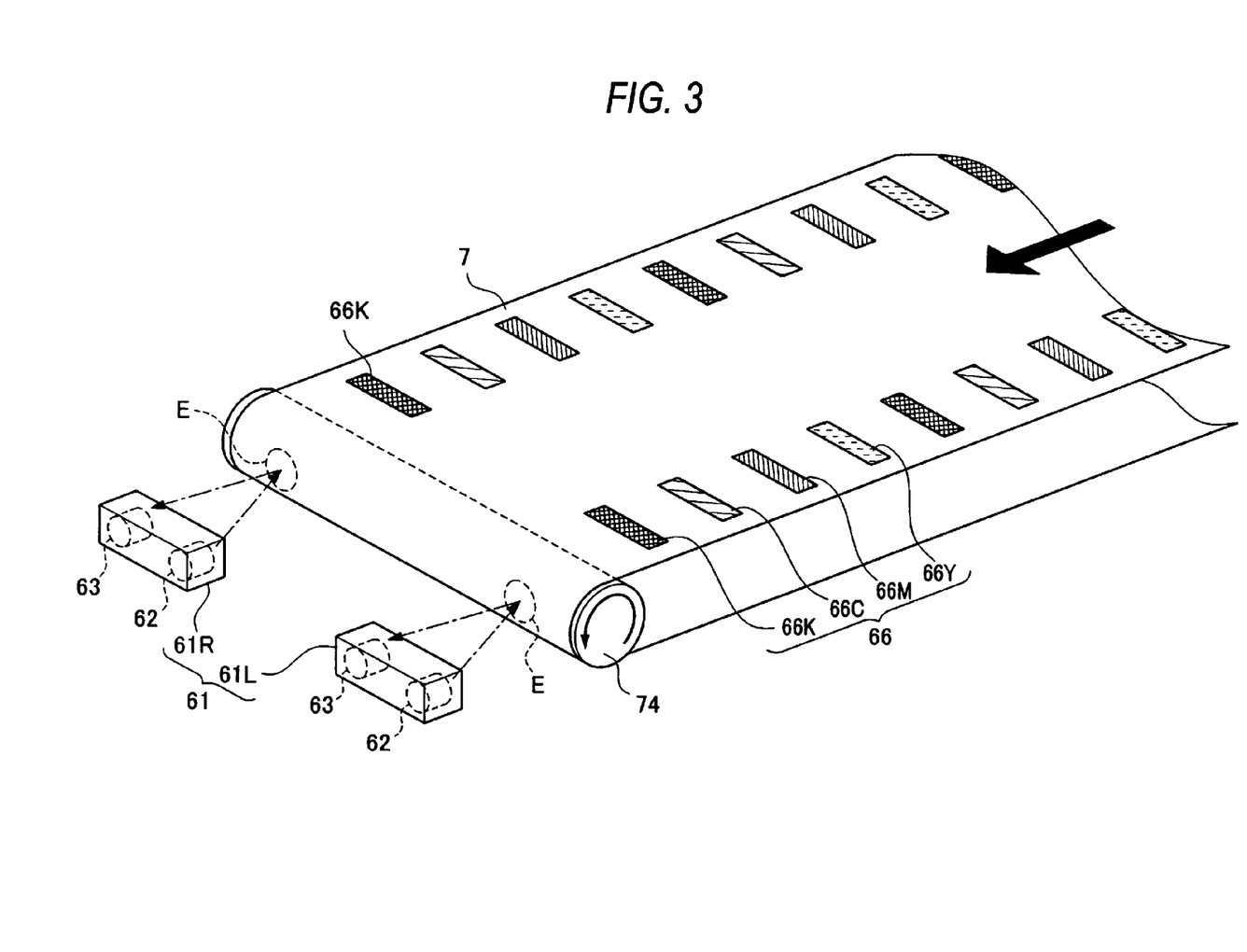
FIG. 3 shows an arrangement of mark sensors.

Specifically, as shown in FIG. 3, the mark sensor 61 includes two sensors, i.e., a sensor 61R that is arranged at a right side of a width direction of the conveyance belt 7 and a sensor 61L that is arranged at a left side thereof. Each of the sensors 61R, 61L is a reflection-type optical sensor having a pair of a light emitting element 62 (for example, LED) and a light receiving element 63 (for example, photo transistor). The mark sensor 61 illuminates light to a surface (dotted ranges E in FIG. 3) of the conveyance belt 7 in an oblique direction by the light emitting elements 62 and receives the light by the light receiving elements 63, respectively. The mark sensor can detect a mark 66 for image adjustment (mark 66 of FIG. 3 is an example of a mark for positional deviation correction) by a difference between an amount of reflection light received when the mark for image adjustment passes and an amount of reflection light received that is directly received from the conveyance belt 7.

[Image Adjustment in MFP]

Next, the image adjustment in the MFP 100 will be described. In the MFP 100, regarding the image adjustment, a positional deviation correction that adjusts positions of images of the respective colors and a density deviation correction that adjusts densities of the respective colors are performed. Both image adjustments include an acquiring process of acquiring amounts of deviation of adjustment colors from a reference color and acquiring correction values specified by the amounts of deviation and a correcting process of correcting an image based on the correction values. Hereinafter, the image adjustment will be described with reference to the positional deviation correction.

First, the acquiring process of the positional deviation correction will be described. The MFP 100 has two modes of acquiring process, which includes an automatic correction and a manual correction. The automatic correction is to adjust an image to an ideal position that is set for the MFP 100. The manual correction is to reflect a user's preference or to substitute for the automatic correction when the automatic correction does not function properly.

In the automatic correction, a registration pattern that is a pattern image for detecting an amount of positional deviation and the mark sensor 61 detects the registration pattern and thus calculates an amount of deviation. A correction value based on the amount of deviation is automatically acquired.

In the manual correction, a user inputs a numerical value through the operation panel 40, so that a correction value is manually acquired.

Here, a sequence of acquiring the correction value in the automatic correction will be described. First, when a predetermined execution condition is satisfied, registration patterns for positional deviation correction are formed by the respective process units 50Y, 50M, 50C, 50K. The execution condition is determined based on an elapsed time period after a previous acquiring process, the number of printed pages, environmental changes such as temperature and humidity and a remaining amount of toner, for example.

Specifically, as shown in FIG. 3, the registration pattern 66 includes a mark group which has a mark 66K formed by the process unit 50K, a mark 66C formed by the process unit 50C, a mark 66M formed by the process unit 50M and a mark 66Y formed by the process unit 50Y, which are arranged in a sub-scanning direction.

The registration pattern 66 is formed at a constant interval in the sub-scanning direction (a moving direction of the conveyance belt 7 shown in FIG. 3). Each of the marks 66K, 66C, 66M, 66Y has a rectangular rod shape and is long in a main scanning direction (direction perpendicular to the sub-scanning direction).

Next, based on digitized signals output from the mark sensor 61, positions of the respective marks 66K, 66Y, 66M, 66C are detected. Then, intervals of marks (for example, marks 66C, 66M, 66Y) of respective adjustment colors relative to a mark of a reference color (for example, mark 66K) in the sub-scanning direction are respectively calculated. The intervals between the mark of the reference color and the adjustment colors are changed when positional deviation occurs in the sub-scanning direction. Therefore, it is possible to specify an amount of deviation of the adjustment color relative to the reference color in the sub-scanning direction. Based on the amount of deviation, a correction value by the automatic correction (hereinafter, referred to as "automatic correction value") is calculated. The automatic correction values are stored in the NVRAM 34.

It is noted that the configuration of the registration pattern 66 is just illustrative and is not limited to the above. The registration pattern may be a general image pattern that is used to correct the positional deviation. For example, the registration pattern may include a pair of two rod-shaped marks wherein at least one is inclined by a predetermined angle to a straight line following the main scanning direction. Such registration pattern can specify an amount of deviation in the main scanning direction as well as in the sub-scanning direction.

In the meantime, the manual correction is executed by a user's operation. A user inputs a desired correction value and then pushes an OK button. When the OK button is pushed, the MFP 100 acquires the input value. Based on the input value, a correction value by the manual correction (hereinafter, referred to as "manual correction value") is calculated. The manual correction value is stored in the NVRAM 34.

The MFP 100 prints a pattern image that is referred to when a user inputs a correction value. As the pattern image, a mark group as shown in FIG. 4A or 4B (hereinafter, referred to as "pattern image 86") is printed.

Figure 4A:
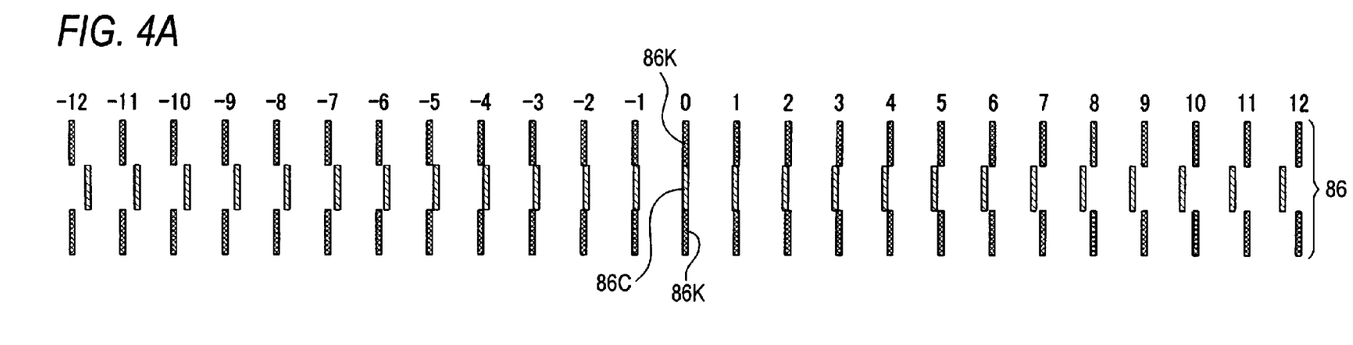
FIGS. 4A and 4B show a printing example of a pattern image for positional deviation correction.

In the pattern image 86 of this illustrative embodiment, marks of the same color having a rectangular rod shape are formed at a constant interval in the main scanning direction (horizontal direction in FIG. 4A). In the example of FIG. 4A, the reference color is black (K color) and the adjustment color is cyan (C color) and an interval of the marks 86C of the adjustment color are narrower than that of the marks 86K of the reference color by N dots (N is natural number and N=1 in this illustrative embodiment). The marks 86K of the reference color are formed as the number (25 in FIGS. 4A and 4B) corresponding to a permissible range of the manual correction value for the adjustment color and numbers (−12 to 12 in FIG. 4) corresponding to the permissible range are added in ascending order from the left. The marks 86C of the adjustment color is the same as the number of the marks of the reference color and a zero mark is printed so that its position of the main scanning direction is matched with a zero mark of the reference color. FIG. 4A shows a case where positional deviation does not occur and the mark of the reference color and the mark of the adjustment color are matched at a zero position.

Figure 4B:
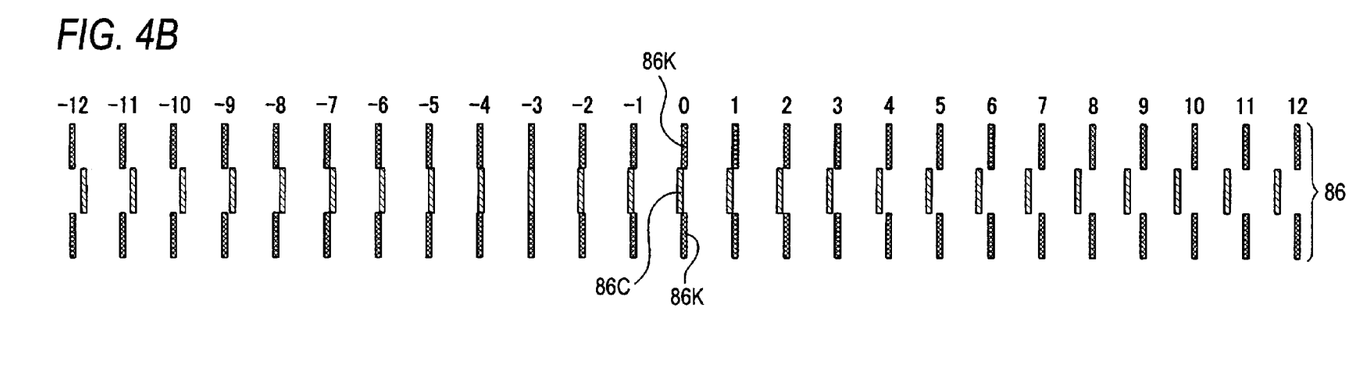

FIG. 4B shows a printing example where positional deviation occurs by 3 dots to the left. In this case, the mark of the reference color and the mark of the adjustment color are not matched at the zero position and are matched at −3 position. Thereby, a user can recognize that positional deviation of 3 dots occurs in the left. In this case, the user can adjust the positional deviation of the C color by inputting '3' as a correction value. When positional deviation of 3 dots occurs in the right, the user inputs '−3' as a correction value. In this illustrative embodiment, the K color is the reference color and the user can also input correction values for the M and Y colors in the same manner, in addition to the C color.

In the meantime, the configuration of the pattern image 86 is just illustrative and is not limited to the above. The pattern image may be a general image pattern that is used to correct the positional deviation. For example, the mark group including the pattern image 86 is formed at a constant interval in the sub-scanning direction (vertical direction in FIG. 4A), so that a user can check the positional deviation of the sub-scanning direction.

In the correction process, an actual correction value is determined by using the automatic correction value and the manual correction value, which are stored in the NVRAM 34. Based on the actual correction value, process conditions (for example, exposure position, speed of the conveyance belt 7 or photosensitive member) of the adjustment color are adjusted so that a position of an image of the adjustment color is matched with a position of an image of the reference color.

In the meantime, the density deviation adjustment also includes the automatic correction and the manual correction. For example, in the automatic correction, density patterns having density differences in the sub-scanning direction are formed by the respective process units 50Y, 50M, 50C, 50K. Then, amounts of reflected light from the density patterns are detected by the common sensor to the positional deviation correction or another optical sensor. In this illustrative embodiment, the detection is performed by the sensor 61L, for example. According to the amounts of reflected light, the densities are specified and differences with a target density are calculated as automatic correction values. In the manual correction, a manual correction value can be received through a user input. Then, in the correction process, an actual correction value is calculated based on the correction values, and the process conditions (for example, exposure intensity, exposure range and developing bias) of the respective colors are adjusted to maintain a target density based on the actual correction value.

[Sequence of Image Adjustment]

Next, a sequence of positional deviation adjustment of the above-described image adjustment will be described. The MFP 100 adjusts the positional deviation by using both the automatic correction value and the manual correction value.

The MFP 100 prompts a user to input the manual correction value when an appropriate amount of deviation cannot be acquired during the automatic acquiring process of acquiring the automatic correction value. Specifically, a user is asked whether to execute the manual acquiring process of acquiring a manual correction value immediately or later. When executing immediately, the manual acquiring process is executed immediately. On the other hand, when executing later, a manual setting flag is turned on and the manual acquiring process is executed when executing a next automatic acquiring process or at any timing by a user.

[Automatic Correcting Process]

Figure 5:
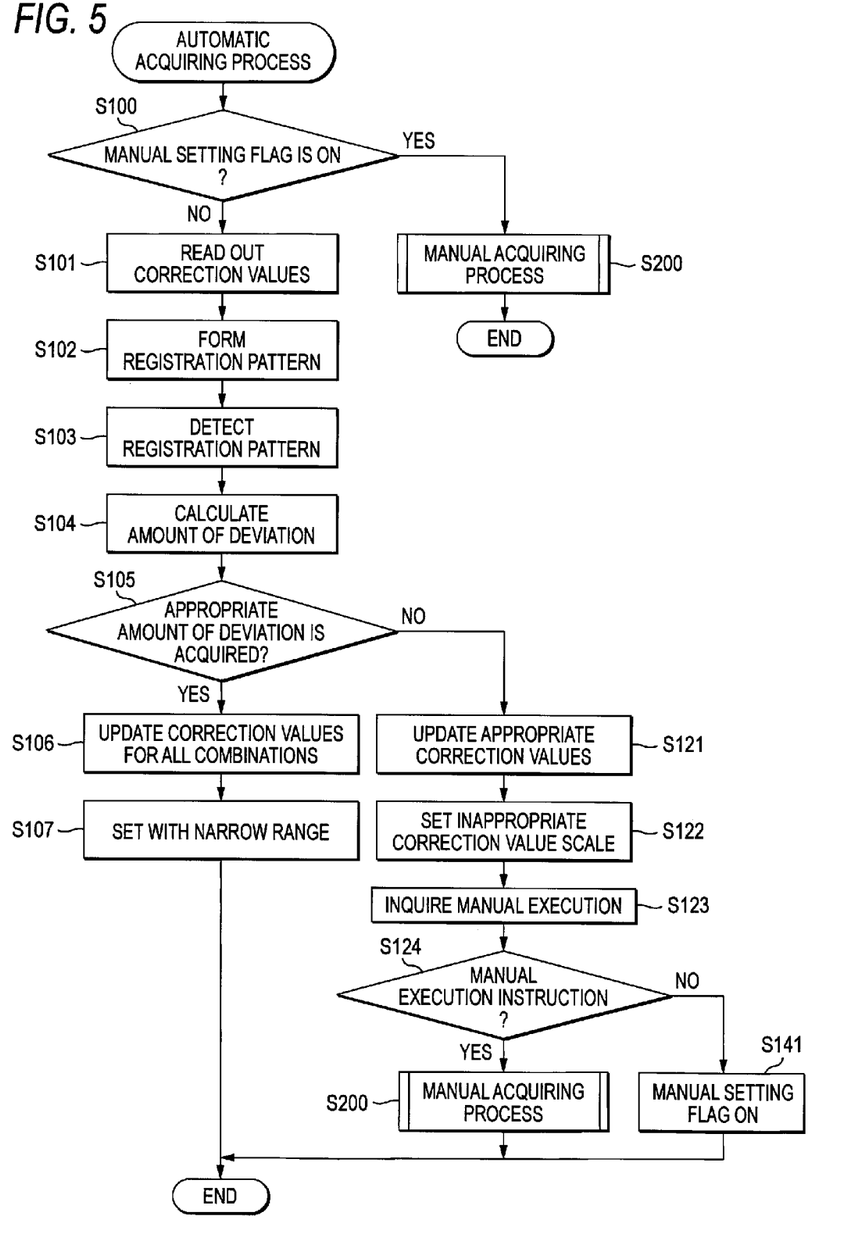
FIG. 5 is a flow chart showing a sequence of an automatic acquiring process.

Next, a sequence of the automatic acquiring process that implements the above operations will be described with a reference to a flow chart of FIG. 5. The automatic acquiring process is executed by the CPU 31 when an execution condition which is determined for automatic correction in advance is satisfied.

First, it is determined whether the manual setting flag is ON (S100). An initial value of the manual setting flag is OFF and the manual setting flag becomes ON when a predetermined condition is satisfied during the automatic acquiring process. The condition of enabling the manual setting flag ON will be described below.

When the manual setting flag is ON (S100:YES), a manual acquiring process of acquiring a manual correction value is executed (S200). The manual acquiring process will be specifically described below. After executing the manual acquiring process, the automatic acquiring process ends. In the meantime, before executing the manual acquiring process, it may be asked whether to execute the manual acquiring process so as to execute the manual acquiring process only when an execution instruction is input.

On the other hand, when the manual setting flag is OFF (S100: NO), the automatic correction values and the manual correction values are read out from the NVRAM 34 (S101). The MFP 100 stores in the ROM 32, an amount of positional deviation before shipment from a factory, as an initial amount of deviation. The initial amount of deviation is an amount of positional deviation that is inherent to an apparatus measured for each apparatus when manufacturing the apparatus and is stored in the ROM 32 before shipment. The initial amount of deviation is set as the initial value of the automatic correction value. In other words, the automatic correction value is a value having the initial amount of deviation added thereto. In the meantime, zero (0) is set as an initial value of the manual correction value.

Then, the registration pattern 66 is formed on the conveyance belt 7 by using the automatic correction value and the manual correction value, which are read out in S101 (S102). Then, the mark sensor 61 detects the registration pattern 66 (S103). Then, the amounts of positional deviation of the respective adjustment colors are calculated based on signals from the mark sensor 61 (S104).

Then, it is determined whether an appropriate amount of positional deviation is acquired (S105). The appropriateness of the amount of positional deviation is determined based on whether the acquired amount of positional deviation is within a predetermined range. The predetermined range is a range within which the positional deviation can be adjusted and is stored in the ROM 32 in advance. The case where an appropriate amount of positional deviation cannot be acquired may be a case where the amount of positional deviation is so large that the adjacent marks are overlapped with each other, for example. This kind of large amount of positional deviation could be caused by an error input of the manual correction value by a user, for example. In addition, when the conveyance belt 7 has a damaged part and the mark sensor 61 falsely detects the damaged part as a mark, an inappropriate amount of positional deviation can be caused. Also, when the mark sensor 61 is out of order, even the amount of positional deviation itself cannot be acquired.

Figure 6:
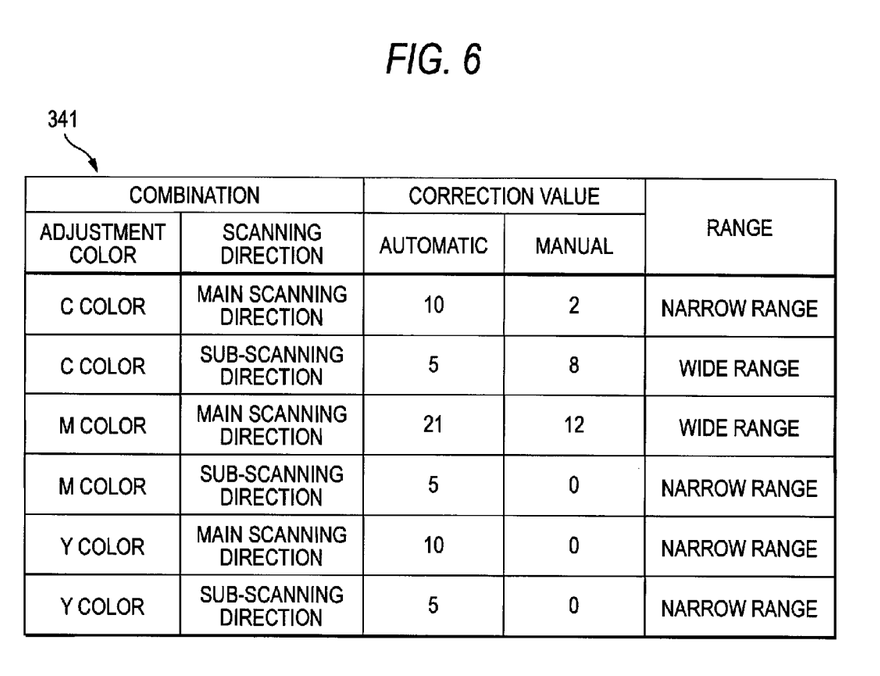
FIG. 6 shows an example of a database that stores correction values.

The amount of positional deviation is determined for each of the adjustment colors (C, M and Y) and for each of scanning directions (main scanning direction and sub-scanning direction). In other words, there exist the amounts of positional deviation, as the number of combinations of the adjustment colors and the scanning directions. Therefore, the MFP 100 has a database 341 as shown in FIG. 6 in the NVRAM 34 and stores the automatic correction value and the manual correction value for each of the combinations of the adjustment colors and the scanning directions. In S105, it is determined whether an appropriate amount of positional deviation can be acquired for all combinations.

In the meantime, a 'narrow range' and a 'wide range' of the database 341 is a set value for an amount of adjustment of a pattern image. In this illustrative embodiment, when the 'narrow range' is set, an image pattern with which an amount of positional deviation can be detected by a unit of one dot is formed. On the other hand, when the 'wide range' is set, an image pattern with which an amount of positional deviation can be detected by a unit of three dots is formed. That is, the pattern image of 'wide range' can approximately determine a correction value with the number of patterns smaller than that of the pattern image of narrow range, so that it is possible to suppress the pattern image from being larger. In contrast, the pattern image of narrow range can finely determine a correction value.

When an appropriate amount of positional deviation is acquired (S105: YES), the amount of positional deviation acquired in S104 is added to the current automatic value, and the result is stored in the database 341 as new automatic correction value, for each of the combinations of the adjustment colors and the scanning directions (S106). In the meantime, there may be set an upper limit value for the automatic correction value. If an automatic correction value is greater than the upper limit value, an automatic correction value that is adjusted to the upper limit value may be stored. Then, the amount of adjustment of the pattern image for all combinations is set with the 'narrow range' (S107). After S107, the automatic correcting process ends.

When an appropriate amount of positional deviation cannot be acquired (S105: NO), an automatic correction value for a combination for which an appropriate amount of positional deviation can be acquired is at first updated (S121). Then, the amount of adjustment of the pattern image is set as the 'narrow range' for that combination. Then, the amount of adjustment for a combination for which an appropriate amount of positional deviation cannot be acquired is set (S122). Specifically, for a combination for which an amount of positional deviation can be acquired but a value thereof exceeds the predetermined range, the 'wide range' is set, and for the other combinations (for example, combinations for which an amount of positional deviation cannot be acquired due to the failure of a sensor or noise), the 'narrow range' is set.

Figure 7:
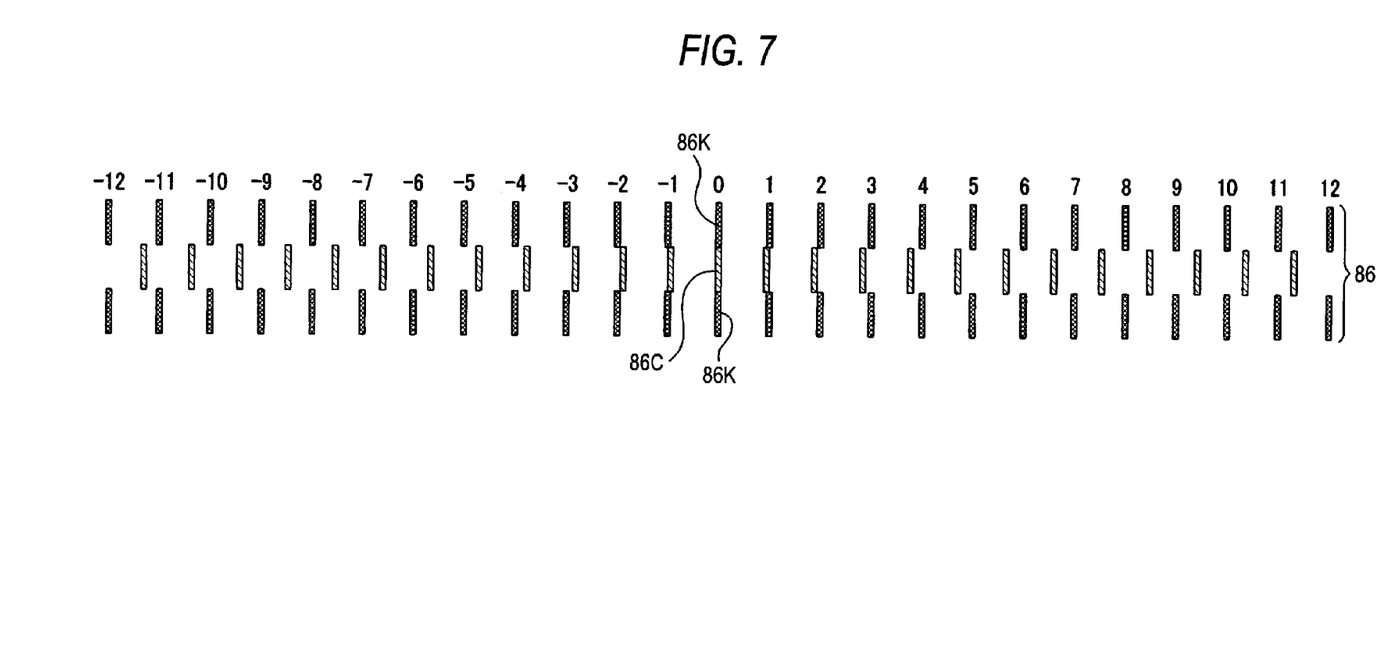
FIG. 7 shows respective printing examples of a wide range pattern image and a narrow range pattern image.

That is, when an amount of positional deviation exceeds the predetermined range, it is possible that the pattern image of narrow range, which is a typical pattern image, exceeds a printable range. For example, FIG. 4A shows an example of a pattern image of 'narrow range' in which marks are formed while an interval of the adjustment color is made to be narrower by one dot than that of the reference color. In this pattern image, it is possible to detect an amount of positional deviation in a unit of one dot within a detectable range of −12 to 12 dots. In other words, when positional deviation exceeds this detectable range is caused, it is difficult to detect the amount of positional deviation. Accordingly, regarding a pattern image of the 'wide range,' marks are formed while an interval of the adjustment color is made to be narrower by three dots, as shown in FIG. 7. Thereby, although an amount of adjustment becomes a unit of three dots, a range within which an amount of positional deviation can be detected becomes −36 to 36 dots, so that the detectable range is three times than as large as the 'narrow range.'

In the meantime, as described above, the pattern images of this illustrative embodiment are to find the number at which the positions of the reference color and the adjustment color are matched from the marks indicated with the numbers of −12 to 12 regardless of the 'narrow range' or 'wide range', and the layouts of the images are the same. Accordingly, it is possible to make the input interface of the correction value same regardless of the pattern images, so that a user does not have to be aware of the difference between the pattern images.

The MFP 100 acquires, as the correction value, (an amount of adjustment N×input value) dots by a user input. At this time, for the 'narrow range,' the amount of adjustment N is 1, and for the 'wide range,' the amount of adjustment N is 3. Thereby, for example, if a value input by a user is '1,' the correction value is 1×1 dot for the 'narrow range' and the correction value is 3×1 dots for the 'wide range.' In addition, even if the same numerical value is input for the 'wide range' and the 'narrow range,' different manual correction values are set. The MFP 100 determines the amount of adjustment N by the correctable range or resolution.

After S122, the user is inquired whether to execute the manual correction (S123). As the inquiring method, a message is displayed on the operation panel 40, for example. In addition, a predetermined information processing apparatus may be caused to display a message. Specifically, in S123, a message is displayed on the operation panel 40 so as to inquire the user to select whether to input a manual correction value immediately or to input a manual correction value at the next automatic acquiring process timing.

When an instruction to execute the manual correction is received, i.e., when a user selects to input a manual correction value immediately (S124: YES), the manual acquiring process is executed (S200). The manual acquiring process will be specifically described below. On the other hand, when an instruction to execute the manual correction is not received, i.e., when the user selects to input a manual correction value at the next automatic acquiring process timing (S124: NO), the manual setting flag is turned on (S141). After S200 or S141, the automatic correction process ends.

[Manual Correcting Process]

Figure 8:
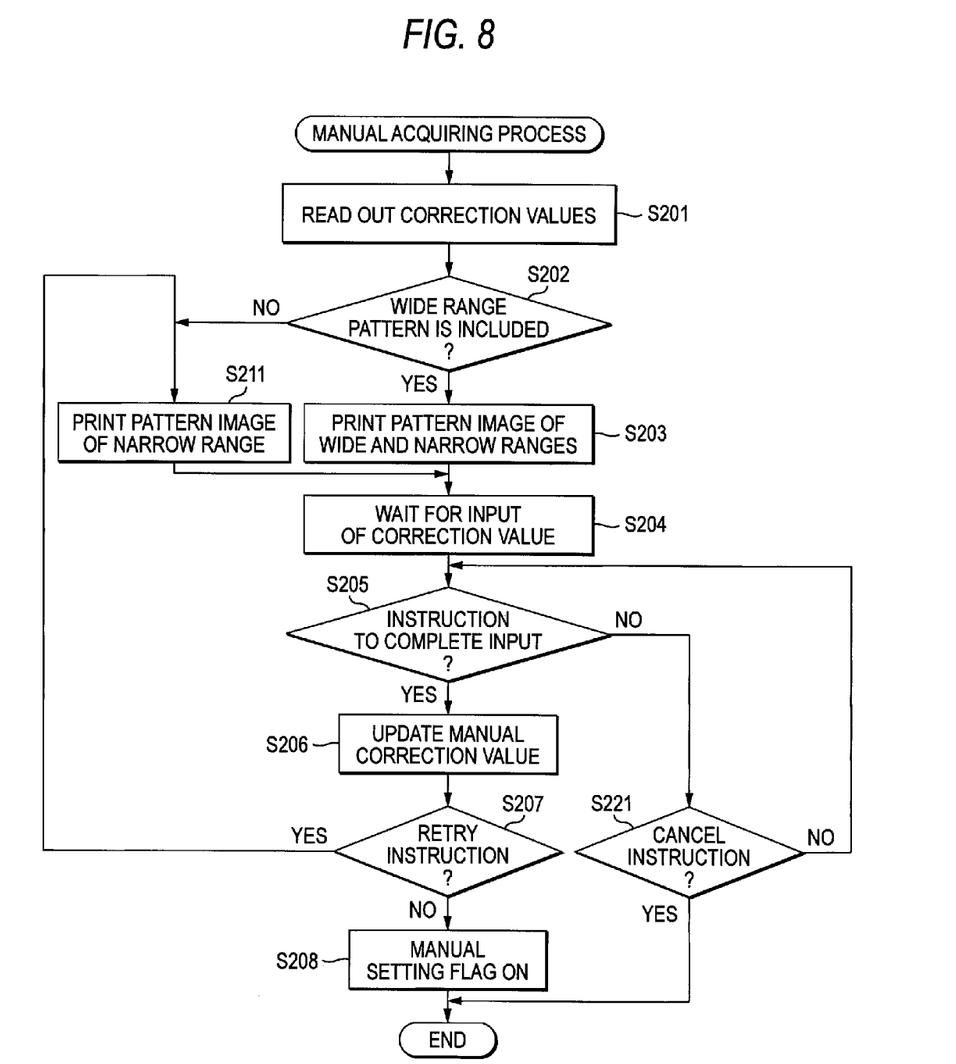
FIG. 8 is a flow chart showing a sequence of a manual acquiring process.

Next, the manual acquiring process of S200 in FIG. 5 will be described with reference to a flow chart of FIG. 8.

First, the automatic correction values, the manual correction values and the setting of the amounts of adjustment are read out from the database 341 of the NVRAM 34 for each of the combinations of the adjustment colors and the scanning directions (S201). Then, it is determined whether the wide range is included in the setting of the amounts of adjustment (S202).

When the wide range is not included in the setting of the amounts of adjustment (S202: NO), the pattern images of narrow range is printed on one sheet for all combinations (S211). On the other hand, when the wide range is included in the setting of the amounts of adjustment (S202: YES), the pattern image of wide range is printed for a combination for which the wide range is set and the pattern image of narrow range is printed for a combination for which the narrow range is set, on one sheet, respectively (S203).

Figure 9:
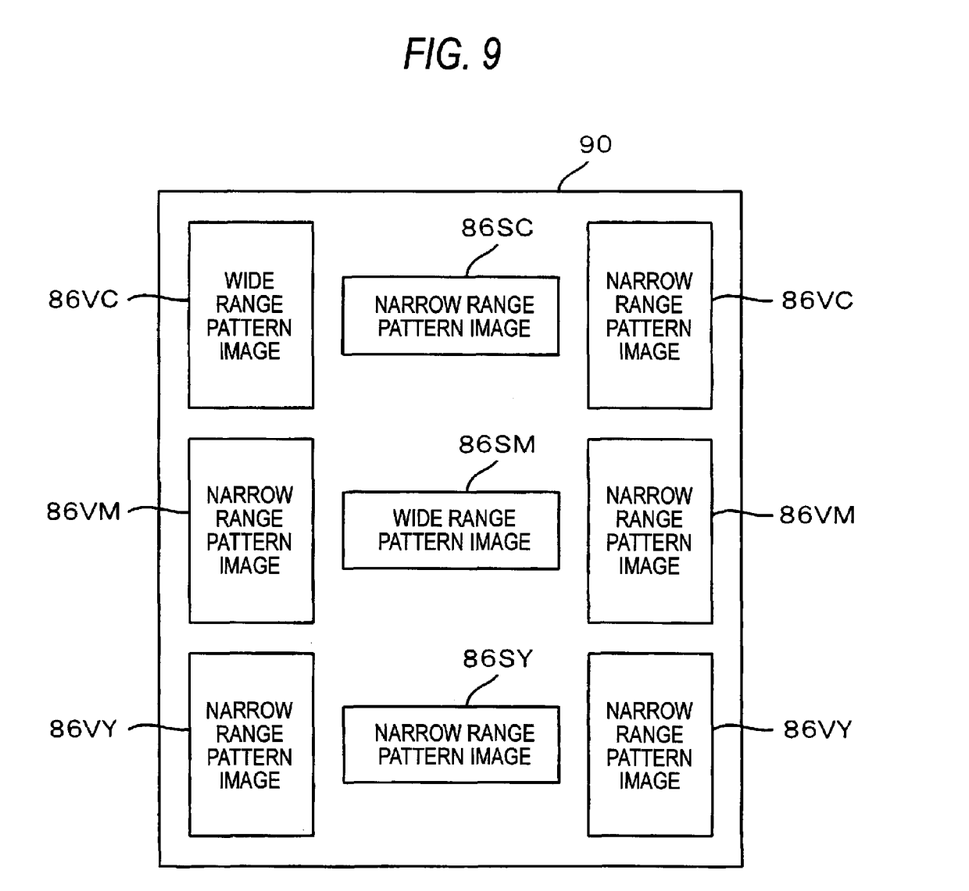
FIG. 9 shows a sheet on which a wide range pattern image and a narrow range pattern image are mixed.

FIG. 9 shows an arrangement example of the respective pattern images when printing the pattern images on a sheet. In the manual acquiring process, there are printed, on a sheet 90, a pattern image 86SC for indicating an amount of positional deviation in the main scanning direction of the C color, a pattern image 86SM for indicating an amount of positional deviation in the main scanning direction of the M color, a pattern image 86SY for indicating an amount of positional deviation in the main scanning direction of the Y color, a pattern image 86VC for indicating an amount of positional deviation in the sub-scanning direction of the C color, a pattern image 86VM for indicating an amount of positional deviation in the sub-scanning direction of the M color and a pattern image 86VY for indicating an amount of positional deviation in the sub-scanning direction of the Y color. In S211, the all pattern images 86SC, 86SM, 86SY, 86VC, 86VM, 96VY are printed with the narrow range. In S203, the pattern image for which the wide range is set is printed with the wide range and the pattern image for which the narrow range is set is printed with the narrow range. In other words, in S203, as shown in FIG. 9, the pattern images of wide range and the pattern images of narrow range are mixed. However, as described above, the pattern image of the 'narrow range' and the pattern image of the 'wide range' have the same appearance, except that the intervals of the adjustment colors are different. Accordingly, there is little possibility to deteriorate user operability.

After S203 or S211, an input of a correction value by a user is waited (S204). The user inputs a correction value with the operation panel 40 while referring to the sheet, on which the pattern images are printed. The user inputs a correction value for each of the combinations of the adjustment colors and the scanning directions.

After that, it is determined whether an instruction to complete the input of the correction value is input (S205). When an instruction to complete the input of the correction value is not input (S205: NO), it is determined whether a cancel instruction is input (S221). When a cancel instruction is also not input (S221: NO), the process returns to S205. When a cancel instruction is input (S221: YES), the manual acquiring process ends.

When an instruction to complete the input of the correction value is input (S205: YES), the input values of the respective combinations are acquired and the manual correction values corresponding to the respective combinations are updated (S206). In other words, the input values are added to the current manual correction values and the results are stored in the NVRAM 34 as new manual correction values. After S206, a retry instruction to print the pattern images is received (S207).

When a retry instruction to print the pattern images is received (S207: YES), the process proceeds to S211 and only the pattern images with narrow range are printed. Thereby, it is possible to check whether the input correction value is properly reflected on a quality of an image. That is, when the pattern images of wide range are printed, it is difficult to adjust the image in more detail. For example, when an interval of the adjustment color is set to be narrower by three dots from that of the reference color, it is difficult to adjust the image in a precision of three dots or less. Accordingly, after performing the adjustment by the wide range, the adjustment by the narrow range is performed to allow the image adjustment of high precision. When a retry instruction to print the pattern images is not received (S207: NO), the manual setting flag is turned off (S208) and the manual acquiring process ends.

[Printing Process]

Figure 10:
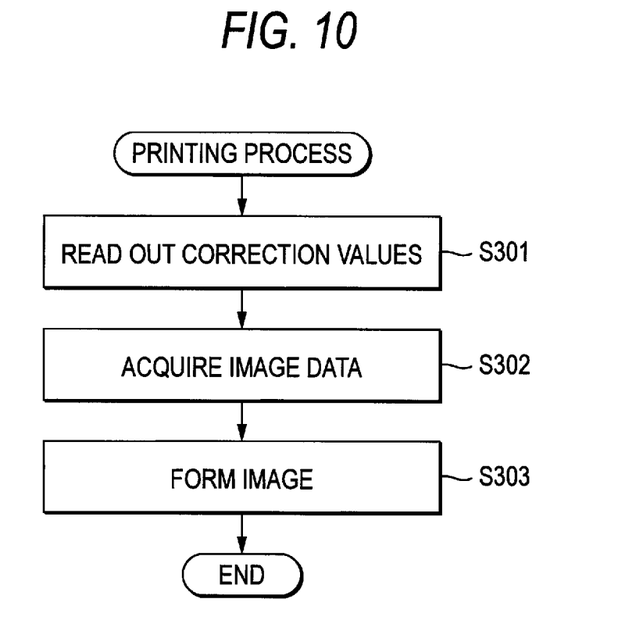
FIG. 10 is a flow chart showing a sequence of a printing process.

Next, a sequence of the printing process of printing image data will be described with reference to a flow chart of FIG. 10. The printing process is executed by the CPU 31 when a print instruction is received from the operation panel 40 or a print job is received from an information processing apparatus connected to the MFP 100.

First, the automatic correction value and the manual correction value are read out from the NVRAM 34 (S301). Then, image data to be printed is acquired (S302). The processes of S301 and S302 may be executed in a reverse order or at the same time.

Then, an actual correction value is determined by using both the automatic correction value and the manual correction value, which are read out in S301, and an image is formed while adjusting the process conditions of the adjustment colors so that positions of images of the adjustment colors are matched at positions of images of the reference color (S303). In other words, even when it has been failed to acquire an amount of positional deviation, it is possible to substitute with the manual correction value, so that a quality of an image is suppressed from being deteriorated.

As described above, when an appropriate amount of positional deviation is not acquired during the automatic acquiring process, the MFP 100 according to this illustrative embodiment executes the manual acquiring process and prints the pattern images for image adjustment (or notifying the execution of the manual acquiring process). Thereby, a user can recognize that an appropriate amount of positional deviation has not been acquired. Furthermore, from the pattern image 86 printed on the sheet, it is possible to specify a correction value. Thereby, a user can recognize that there exists a method of inputting a manual correction value that can be specified from the pattern image 86, as a solving measure when an appropriate amount of positional deviation cannot be acquired. In addition, the MFP 100 can receive the manual correction that is input by a user and can adjust an image by using the manual correction value. As a result, it is expected that the deterioration of a quality of an image would be suppressed.

While the present invention has been shown and described with reference to certain illustrative embodiments thereof, it will be understood by those skilled in the art that various changes in form and details may be made therein without departing from the spirit and scope of the invention as defined by the appended claims.

For example, the image forming apparatus is not limited to the MFP. In other words, the inventive concept of the present invention can be applied to any apparatus having a printing function such as printer, copier, FAX apparatus and the like. In addition, the image forming apparatus is not limited to an electro-photographic type and may be an inkjet type. Further, the MFP 100 of the illustrative embodiment is a direct transfer tandem type. However, the MFP may be an intermediate transfer type or 4-cycle type.

In the above illustrative embodiment, the MFP has the color printing function. However, the inventive concept of the present invention can also be applied to a monochrome printing apparatus inasmuch as it performs the positional deviation correction or density deviation correction.

In the above illustrative embodiment, the manual acquiring process is executed by the automatic acquiring process. However, a user may execute the manual acquiring process at any timing. For example, the operation panel 40 may be provided with a switch button for switching into a manual correction mode where an input of a correction value is permitted. Then, when the user pushes the switch button, the manual acquiring process may be executed.

In the above illustrative embodiment, in S123, the user is inquired to select whether to input the correction value immediately or at a next automatic acquiring process timing. However, the selection item is not limited thereto. For example, a selection option with which a user can execute the manual acquiring process at any timing may be provided inasmuch as the arbitrary manual acquiring process can be executed. In other words, a selection option prompting a user to execute the manual acquiring process may be provided.

In the above illustrative embodiment, the MFP 100 has the manual acquiring unit that acquires the manual correction value, which is specified by the pattern image 86, by the user input and forms an image based on the actual correction value that is determined by using the automatic correction value acquired in the automatic acquiring process and the manual correction value. However, the present invention is not limited thereto. For example, the MFP may form an image based on a new automatic correction value that is obtained by adding the correction value, which is acquired by a user input during the automatic acquiring process, to the automatic correction value.

In the above illustrative embodiment, the automatic acquiring process for positional deviation correction has been described. However, the inventive concept of the present invention can be also applied to the density deviation correction. For the density deviation correction, a pattern image that is compared with a sample is prepared in advance. In this sample, a density pattern in which a plurality of density differences is given for the respective colors is printed. Then, when an appropriate amount of density deviation is not acquired during the automatic acquiring process for density correction, the MFP 100 prints on a sheet a density pattern in which a plurality of density differences is given for the respective colors like the sample, and receives an input of a correction value for density deviation. Then, a user compares the density pattern that is printed during the automatic acquiring process with the density pattern of the sample and inputs a manual correction value that can be specified from the patterns, so that the MFP adjusts an image. As a result, it is expected that the deterioration of a quality of an image is suppressed.

The present invention provides illustrative, non-limiting embodiments as follows:

An image forming apparatus includes: an automatic acquiring unit which is configured to form a mark for detecting at least one of positional deviation and density deviation and acquire an amount of deviation by measuring the mark; an image forming unit which is configured to form an image while adjusting at least one of positional deviation and density deviation based on a correction value specified by the amount of deviation; and an output unit which is configured to execute at least one of a pattern printing process and a notifying process when an amount of deviation within a permissible range is not acquired by the automatic acquiring unit, the pattern printing process including printing a pattern image for specifying a correction value of at least one of positional deviation and density deviation, on a recording sheet, the notifying process including making notification for prompting execution of the pattern printing process.

The above image forming apparatus forms a mark for detecting at least one of positional deviation and density deviation and forms an image based on a correction value (automatic correction value) that is specified by an amount of deviation acquired by measuring the mark. If an amount of deviation within a permissible range is not acquired, the image forming apparatus executes a pattern printing process of printing a pattern image for specifying a correction value or a notifying process of prompting printing of a pattern image. The notifying process may include displaying a message on an operation panel of the apparatus, which prompts a user to input a correction value, for example. The pattern printing process or notifying process may be performed immediately when an amount of deviation exceeds a predetermined range or may be performed when an amount of deviation is acquired next time.

In other words, the above image forming apparatus prints a pattern image for image adjustment (or notifies a printing of a pattern image) when an amount of deviation within a permission range is not acquired during the automatic acquiring process. Thereby, a user can recognize that an appropriate amount of deviation has not been acquired. Furthermore, from the pattern image printed on a sheet, it is possible to specify a correction value that is necessary for image adjustment. Thereby, a user can recognize that there exists a method of inputting a correction value (manual correction value) that can be specified from the pattern image, as a solving measure when an appropriate amount of deviation cannot be acquired.

The output unit may be configured to execute the pattern printing process or notifying process when the automatic acquiring unit fails to acquire an amount of deviation. When an amount of deviation is not acquired by the automatic acquiring unit, it is difficult to cope with the situation only with the automatic acquiring unit. Therefore, it may be preferable that an amount of deviation is supplemented by a user input. The case where it is failed to acquire an amount of deviation includes a case where an amount of deviation cannot be acquired (for example, positional deviation is great and registration patterns of different colors are overlapped) or a case where a failure cause is clear (for example, a sensor is out of order).

Additionally, the image forming apparatus may include a storage unit which is configured to store a correction value acquired by a user input based on the pattern image, and the automatic acquiring unit may be configured to form the mark based on at least the correction value stored in the storage unit. The correction value input by a user is used to form the mark, so that it is expected that an appropriate amount of deviation will be acquired by the automatic acquiring unit from next time.

Further, the pattern image may include a pattern image for wide range correction and a pattern image for narrow range correction, and when an amount of deviation within the permissible range is not acquired by the automatic acquiring unit, the pattern image for wide range correction may be printed in the pattern printing process. The failure of the automatic acquirement of an amount of deviation may mean that the positional deviation or density deviation is considerably large. In this case, it may be preferable that the pattern image for wide range correction having a high correction scale is printed to easily perform the automatic correction.

Further, the patter image may includes a pattern image for wide range correction and a pattern image for narrow range correction, and for a color whose amount of deviation exceeds the permissible range, the pattern image for wide range correction may be printed in the pattern printing process, and for a color whose amount of deviation is within the permissible range, the pattern image for narrow range correction may be printed in the pattern printing process. When the pattern image for wide range correction is used even for a color for which an amount of deviation that is within the permissible range is acquired, even an appropriate color may be greatly changed. Therefore, it may be preferable to use the pattern image for wide range correction only for an inappropriate color.

Further, the patter image may include a pattern image for wide range correction and a pattern image for narrow range correction, and for a scanning direction whose amount of deviation exceeds the permissible range, the pattern image for wide range correction may be printed in the pattern printing process, and for a scanning direction whose amount of deviation is within the permissible range, the pattern image for narrow range correction may be printed in the pattern printing process. When the pattern image for wide range correction is used even for a scanning direction for which an amount of deviation that is within the permissible range is acquired, even an appropriate scanning direction may be drastically changed. Therefore, it may be preferable to use the pattern image for wide range correction only for an inappropriate scanning direction.

Further, a unit amount of adjustment of the pattern image for wide range correction with respect to a user input may be larger than that of the pattern image for narrow range correction. In other words, regarding a unit amount of adjustment with respect to a user input value, the pattern image for wide range correction has a factor N and the pattern image for narrow range correction has a factor M (M<N). When a user input is '1', for example, the correction value for wide range correction becomes 1×N dots and the correction value for narrow range correction becomes 1×M dots. Accordingly, the pattern image for wide range correction can approximately determine a correction value with the number of patterns smaller than that of the pattern image for narrow range correction, so that it is possible to suppress the pattern image from being larger. In the meantime, the pattern image for narrow range correction can finely determine a correction value.

What is claimed is:
1. An image forming apparatus comprising:
an image forming unit configured to form an image;
a belt unit comprising a belt and configured to convey a recording sheet;
a discharge unit configured to discharge the recording sheet;
a controller configured to:
form a first mark for detecting at least one of positional deviation and density deviation with the image forming unit on the belt;
acquire an amount of deviation by measuring the first mark formed on the belt, the amount of deviation corresponding to the at least one of positional deviation and density deviation;
if the amount of deviation is within a predetermined permissible range:
determine a correction value for adjusting the at least one of positional deviation and density deviation based on the amount of deviation, and
adjust the at least one of positional deviation and density deviation based on the correction value; and
if the amount of deviation is out of the predetermined permissible range:
form a second mark for detecting the at least one of positional deviation and density deviation on the recording sheet; and
discharge the recording sheet by the discharge unit;
wherein the belt unit is configured to convey the recording sheet such that the recording sheet passes between the belt unit and the image forming unit, wherein, prior to conveying in the recording sheet, the controller forms the first mark, wherein, prior to conveying in the recording sheet, the controller determines the correction value based on the amount of deviation being within the predetermined permissible range, wherein the belt unit is configured to convey the recording sheet while the controller forms the second mark based on the amount of deviation being out of the predetermined permissible range.

2. The image forming apparatus according to claim 1, wherein the controller is configured to form the second mark for detecting the at least one of positional deviation and density deviation when the controller fails to acquire the amount of deviation.

3. The image forming apparatus according to claim 1, further comprising:

a storage unit which is configured to store a correction value acquired from a user input based on the second mark formed on the recording sheet, wherein the controller is configured to form the first mark based on at least the correction value stored in the storage unit.

4. The image forming apparatus according to claim 1, wherein the second mark includes a pattern image for wide range correction and a pattern image for narrow range correction, and wherein, when an amount of deviation within the predetermined permissible range is not acquired by the controller, the controller is configured to form the pattern image for wide range correction.

5. The image forming apparatus according to claim 1, wherein the second mark formed on the recording sheet includes a pattern image for wide range correction and a pattern image for narrow range correction, and wherein, for a color whose amount of deviation exceeds the predetermined permissible range, the controller is configured to form the pattern image for wide range correction, and wherein, for a color whose amount of deviation is within the predetermined permissible range, the controller is configured to form the pattern image for narrow range correction.

6. The image forming apparatus according to claim 1, wherein the second mark formed on the recording sheet includes a pattern image for wide range correction and a pattern image for narrow range correction, and wherein, for a scanning direction whose amount of deviation exceeds the predetermined permissible range, the controller is configured to form the pattern image for wide range correction, and wherein, for a scanning direction whose amount of deviation is within the predetermined permissible range, the controller is configured to form the pattern image for narrow range correction.

7. The image forming apparatus according to claim 4, wherein a unit amount of adjustment of the pattern image for wide range correction is larger than that of the pattern image for narrow range correction.

8. The image forming apparatus according to claim 1, wherein the controller is further configured to execute a notifying process, the notifying process comprising notifying a user of forming the second mark on the recording sheet prior to forming the second mark on the recording sheet.

* * * * *